US012688675B2

(12) United States Patent
Sun et al.

(10) Patent No.: US 12,688,675 B2
(45) Date of Patent: Jul. 21, 2026

(54) FEW-SHOT IMAGE CLASSIFICATION METHOD BASED ON HIERARCHICAL LEARNING GENETIC PROGRAMMING ALGORITHM

(71) Applicant: Guangxi University, Nanning (CN)

(72) Inventors: Yu Sun, Nanning (CN); Zhiqiang Zhang, Nanning (CN); Zhenhua Tang, Nanning (CN)

(73) Assignee: Guangxi University, Nanning (CN)

( * ) Notice: Subject to any disclaimer, the term of this patent is extended or adjusted under 35 U.S.C. 154(b) by 0 days.

(21) Appl. No.: 19/406,992

(22) Filed: Dec. 3, 2025

(65) Prior Publication Data

US 2026/0196022 A1 Jul. 9, 2026

(30) Foreign Application Priority Data

Jan. 6, 2025 (CN) ......................... 202510014560.0

(51) Int. Cl.
*G06V 10/764* (2022.01)
*G06V 10/42* (2022.01)
(Continued)

(52) U.S. Cl.
CPC ............ *G06V 10/764* (2022.01); *G06V 10/42* (2022.01); *G06V 10/44* (2022.01);
(Continued)

(58) Field of Classification Search
CPC ...... G06V 10/42; G06V 10/44; G06V 10/764; G06V 10/7747; G06V 10/776; G06V 10/82
See application file for complete search history.

(56) References Cited

U.S. PATENT DOCUMENTS

| | | | | |
|---|---|---|---|---|
| 11,593,631 | B2 * | 2/2023 | Dalli | G06N 3/0495 |
| 2020/0264300 | A1 * | 8/2020 | Rostami | G01S 13/867 |

(Continued)

FOREIGN PATENT DOCUMENTS

| | | | |
|---|---|---|---|
| CN | 114662593 | A | 6/2022 |
| CN | 117274692 | A | 12/2023 |
| CN | 118552768 | A | 8/2024 |

OTHER PUBLICATIONS

Fan et al., "ES-GP: An Ensemble Surrogate-Assisted Genetic Programming Approach to Image Classification", IEEE Transactions on Evolutionary Computation, May 14, 2015, pp. 1-14; (Year: 2015).*

*Primary Examiner* — Jennifer Mehmood
*Assistant Examiner* — Jose M Torres
(74) *Attorney, Agent, or Firm* — Nitin Kaushik

(57) ABSTRACT

Disclosed is a few-shot image classification method based on a hierarchical learning genetic programming algorithm: constructing a few-shot image classification system based on the hierarchical learning genetic programming algorithm; dividing the image data set into a training set and a test set; performing image preprocessing and feature extraction operations on the training set to construct a feature storage table; constructing an ensemble solution by using features in the feature storage table as terminal inputs, and optimizing a final classification effect by using an ensemble strategy based on an individual difference value; using the test set as an input of an image classification solution, outputting predicted class labels of the test set, and evaluating a performance of the image classification solution according to an actual label of the test set; using to-be-classified image data as the input of the image classification solution, and outputting an image classification result.

7 Claims, 8 Drawing Sheets

(51) Int. Cl.
*G06V 10/44* (2022.01)
*G06V 10/774* (2022.01)
*G06V 10/776* (2022.01)
*G06V 10/82* (2022.01)

(52) U.S. Cl.
CPC ........ *G06V 10/7747* (2022.01); *G06V 10/776* (2022.01); *G06V 10/82* (2022.01)

(56) References Cited

U.S. PATENT DOCUMENTS

| | | | | |
|---|---|---|---|---|
| 2020/0334490 | A1* | 10/2020 | Shen | G06N 3/045 |
| 2021/0089880 | A1* | 3/2021 | Karlinsky | G06N 3/08 |
| 2021/0358127 | A1* | 11/2021 | Jagadeesh | G06N 3/045 |
| 2021/0397876 | A1* | 12/2021 | Hemani | G06V 10/761 |
| 2022/0147838 | A1* | 5/2022 | Gu | G06N 5/022 |
| 2022/0172036 | A1* | 6/2022 | Schwartz | G06N 3/08 |
| 2024/0161360 | A1* | 5/2024 | Kumar | G06T 9/00 |
| 2026/0011138 | A1* | 1/2026 | Takehara | G06V 10/82 |

* cited by examiner

FEW-SHOT IMAGE CLASSIFICATION METHOD BASED ON HIERARCHICAL LEARNING GENETIC PROGRAMMING ALGORITHM

CROSS-REFERENCE TO RELATED APPLICATIONS

The application claims priority to Chinese patent application No. 2025100145600, filed on Jan. 6, 2025, the entire contents of which are incorporated herein by reference.

TECHNICAL FIELD

The present disclosure relates to the technical field of image classification, in particular to a few-shot image classification method based on a hierarchical learning genetic programming algorithm.

BACKGROUND

An image classification task involves automatically classifying images into predefined classes. In the cases of high image quality and sufficient samples, usually, such a task can be efficiently and accurately completed. However, in practical applications, common problems faced are lower sample quality and insufficient quantity, which makes accurate classification of low-quality and few-shot images become a challenging task. A genetic programming (GP) algorithm can model solutions of various application problems as individuals in a population, and automatically evolve an appropriate solution. Nowadays, it has been proven that the GP algorithm can effectively solve the problem of image classification, however, the current GP-based method is limited in program structure, and is particularly poor in effect when processing the low-quality and few-shot images. Due to a larger solution space, the GP algorithm is prone to local optima trapping, but such a problem is often not sufficiently discussed and researched. In addition, the optimal individual generated by using the GP algorithm may excessively fit to training data, which leads to poor performances on new or unknown data.

The prior art has the defects that all image processing steps are integrated into a program structure in an existing image classification method based on the GP algorithm, which leads to the complexity of the program structure and brings a huge search space; and the search capability of the GP is weaker, which seriously affects performances of the algorithm. At the same time, existing research is mainly designed for the condition that samples are sufficient, and therefore, when there is less training data, the performances of the existing algorithm are usually insufficient.

SUMMARY

A few-shot image classification method based on a hierarchical learning genetic programming algorithm provided by the present disclosure can achieve a good classification effect in the case that the number of samples is limited.

In order to achieve the above-mentioned purpose, the present disclosure provides a few-shot image classification method based on a hierarchical learning genetic programming algorithm, including the following steps:

- step 1: constructing a few-shot image classification system based on the hierarchical learning genetic programming algorithm, wherein the few-shot image classification system is provided with an image acquisition module, the image acquisition module is connected with a hierarchical evolutionary learning framework, and the hierarchical evolutionary learning framework is provided with a parallel exploration genetic programming (PEGP) module on a first layer and a development-ensemble genetic programming (DEGP) module on a second layer;
- step 2: acquiring an image data set, and dividing the image data set into a training set and a test set by the image acquisition module;
- step 3: acquiring training set data, and performing image preprocessing and feature extraction operations on the training set data to construct a feature storage table, and then transferring the feature storage table to the DEGP module by the PEGP module;
- step 4: further constructing an ensemble solution by using features in the feature storage table as terminal inputs, and finally optimizing a final classification effect by using an ensemble strategy based on an individual difference value by the DEGP module, thereby outputting a high-performance image classification solution;
- step 5: using the test set as an input of the image classification solution, then, outputting predicted class labels of the test set, and finally, evaluating a performance of the image classification solution according to an actual label of the test set; and
- step 6: acquiring to-be-classified image data, using the to-be-classified image data as the input of the image classification solution, and outputting an image classification result by the image acquisition module.

By means of the above-mentioned design, the hierarchical evolutionary learning framework is adopted in the present disclosure to reduce a search space and efficiently find a classification solution.

On the first layer, PEGP is defined, the first-layer learning focuses on image preprocessing and feature extraction so that the feature storage table is constructed. By exploring the diversified and effective feature construction blocks in parallel, this layer can improve the combined generation efficiency of preprocessing and feature extraction in the GP algorithm, and finally output diversified feature blocks as second-stage inputs.

On the second layer, DEGP is defined for combining the feature blocks in a search space under the guidance of a newly defined program structure on the basis of the feature storage table, and generates the ensemble solution. The framework based on hierarchical learning significantly reduces the search space of the GP algorithm, thereby ensuring that key feature information can be captured by the final solution, and a high performance can be maintained even if there are fewer training samples.

In addition, in view of the weaker generalization capability of a GP method when a few-shot image classification task is coped, the ensemble strategy based on the individual difference value is further provided to improve a classification performance.

As a preference, in step 1, the PEGP module is provided with three different types of feature exploration blocks in parallel, the three feature exploration blocks are respectively a first feature exploration block, a second feature exploration block, and a third feature exploration block, program structures, function sets and terminal sets of the first feature exploration block, the second feature exploration block and the third feature exploration block are respectively set, and the first feature exploration block, the second feature exploration block and the third feature exploration block generate three feature construction blocks with different evolutionary directions in parallel.

In order to ensure that the generated feature construction blocks are effective and diversified, the three feature construction blocks with different evolutionary directions must be configured on the PEGP algorithm on the first layer, and each of the feature construction blocks is provided with a new program structure, function set and terminal set.

The PEGP module generates the population by adopting the three different program structures, and these different structures respectively generate individuals representing different-type feature construction methods. When an evolutionary learning process is ended, a plurality of high-quality individuals are outputted by the algorithm, and these individuals are defined as the different feature construction blocks according to feature types represented by them.

As a preference, the first feature exploration block adopts a linear genetic programming (LGP) algorithm focusing on local features, and the program structure of the first exploration block includes a region extraction layer, a first image filtering layer, a first feature extraction layer, and a first feature concatenation layer;

the second feature exploration block adopts a grammar-guided genetic programming (GGP) algorithm focusing on global features, and the program structure of the second feature exploration block includes a second image filtering layer and a second feature extraction layer; and the third feature exploration block adopts a Cartesian genetic programming (CGP) algorithm focusing on concatenated features, and the program structure of the third feature exploration block includes a third image filtering layer, a maximum pooling layer, a third feature extraction layer, and a second feature concatenation layer.

The PEGP module adopts the LGP algorithm focusing on local features, the GGP algorithm focusing on global features and the CGP algorithm focusing on concatenated features so as to evolve the different types of feature construction blocks.

In view of acquiring the effectiveness of the local features, the region extraction layer, the filtering layer, the feature extraction layer and the feature concatenation layer are included in the design of the LGP algorithm so that effective local features are extracted. An effective region is selected according to functions of the region extraction layer, and filtering is performed on a region extracted according to functions of the image filtering layer. Functions of the feature extraction layer are used to extract features from an image by selecting an existing feature extraction method. Outputs of the feature extraction layer can be concatenated according to functions of the feature concatenation layer. By means of the program structure designed for the LGP algorithm, the individuals generated by evolution focus on different features in a single region or the same feature in a plurality of regions.

The GGP algorithm includes the image filtering layer and the feature extraction layer. A plurality of type filtering functions are put on the image filtering layer, its input and output are consistent, and the generated individuals may be filtered repeatedly. Features may be extracted from a filtered image or an original image according to functions of the feature extraction layer. The program structure of the GGP algorithm guides the individuals to be partial to repeated filtering and combined search of the global features.

For the CGP algorithm, the maximum pooling layer and the feature construction layer are added on the basis of the GGP algorithm. The design of the pooling layer helps the reduction of time spent in subsequent steps. Functions of the feature concatenation layer are designed as a flexible layer, by which different types of global features will be concatenated. The program structure designed for the CGP algorithm will make the learning of the individuals to be partial to the concatenation of different global features.

As a preference, in step 3, the PEGP module constructs the feature storage table, which includes the following steps:

step A1: initializing a population: acquiring the training set data, and initializing a population by the feature exploration blocks according to a predetermined program structure, function set and terminal set; each individual in the population can be regarded as a feature extraction algorithm.

step A2: evaluating the fitness of an individual: extracting features from the training set, and then inputting the extracted features to a support vector machine (SVM) by each individual in the population, and outputting the predicted class labels, and then evaluating the individual by the SVM by adopting a classification accuracy to obtain a fitness value corresponding to the individual;

wherein a computation expression of the classification accuracy is show as follows:

$$\text{Fitness} = \left(\frac{N_{correct}}{N_{total}}\right) \times 100\%$$

wherein $N_{correct}$ is a correctly predicted number of examples, $N_{total}$ is a total number of the examples, and Fitness is the fitness value of the individual;

in this process, in order to reduce the possibility of overfitting, a k-fold cross validation method is adopted. In addition, in order to ensure the sufficiency of cross validation, a value of k is set as a smaller value from the number of each class of training samples n and 10;

step A3: performing an elite operation: selecting an optimal individual in the population by adopting an elite strategy, and directly copying the optimal individual to a next-generation population;

step A4: performing a selection operation: selecting a certain number of individuals from the population by adopting a tournament selection method, wherein each individual has an equal probability of being selected; and selecting an individual with the best fitness value according to the fitness value of each individual to perform crossover and mutation operations to generate a new individual;

step A5: repeating steps A2-A4 until the maximum number of iterations is reached, and then, performing step A6;

step A6: selecting the top 50% of individuals in a final-generation population as the feature construction blocks; and step A7: extracting corresponding features from the training set by using the feature construction blocks, numbering the features, storing the features into the feature storage table, and using the features as inputs for second-layer learning.

The PEGP module generates initial populations in parallel according to the three different program structures, function sets and terminal sets by using the training data set as an input. Then, these populations are evolved in parallel, each evolved population outputs construction blocks with specific features, and these construction blocks are then stored and used as the inputs for the second-layer learning to ensure that the DEGP module has sufficient diversified features to be selected and optimized.

As a preference, a new program structure, function set and terminal set are set for the DEGP module, and the program structure of the DEGP module includes a feature construction layer, a classification layer, and a combination layer;

the feature construction layer is configured to use at least two features in the feature storage table as inputs and return one concatenated feature or construct new features according to parameters;

the classification layer is configured to use output features of the feature construction layer as inputs and output the predicted class labels; and the combination layer is configured to perform a voting or weighting method by using at least two sets of the predicted class labels outputted by the classification layer as inputs so as to output a new predicted class label.

The program structure, the function set and the terminal set of the DEGP module are comprehensively redesigned so that an ensemble process is optimized; and a final solution for an image classification task is developed by an evolutionary learning process under the guidance of the newly defined program structure, terminal set and function set.

As a preference, in step 4, the DEGP module further constructs the ensemble solution, which includes the following steps:

(1) Population Evolutionary Learning step B1: initializing a population: acquiring the features in the feature storage table, and initializing a population by the DEGP module according to a new program structure, function set and terminal set, wherein a classification solution is mapped by each individual in the population and is outputted as a predicted class label;

step B2: evaluating the fitness of an individual: extracting the features from the feature storage table, outputting the predicted class labels, and then evaluating a fitness value of the individual by each individual in the population;

step B3: performing an elite operation: selecting an optimal individual in the population by adopting an elite strategy, and directly copying the optimal individual to a next-generation population;

step B4: performing a selection operation: selecting a certain number of individuals from the population by adopting a tournament selection method, and selecting an individual with the best fitness value according to the fitness value of each individual to perform crossover and mutation operations to generate a new individual;

step B5: repeating steps B2-B4 until a preset upper limit of iterations is reached, and then, performing step B6;

(2) Ensemble Strategy Based on Individual Difference Value step B6: selecting an individual with an optimal performance in the final-generation population as a benchmark, computing a difference value of other individuals in the population, and evaluating feature differences of the optimal individual and other individuals in the population according to the computed difference value;

wherein an expression of the computed difference value is shown as follows:

$$D(\text{best}, i) = |S_{best} \cup S_i| - |S_{best} \cap S_i|$$

wherein $S_{best}$ represents the number of feature labels of the optimal individual in the population, D represents the difference value, and Si represents the number of feature labels of other individuals in the population; and step B7: selecting seven individuals with the maximum difference value $S_{best}$ to perform voting ensemble to obtain the image classification solution.

The DEGP module follows the guidance of the new program structure, function set and terminal set to select the features from the feature storage table as the terminal inputs of the DEGP module and hereby generate the initial populations. The populations perform refined evolutionary learning by means of genetic operators until set ending conditions are met. By such a process, the DEGP not only improves the effectiveness of individual features, but also enhances the wide applicability and robustness of the solution. Finally, a plurality of high-quality individuals are selected and ensemble by the algorithm according to the difference value of the individuals, a final classification effect is optimized by this difference-based ensemble strategy, and then, the high-performance image classification solution is outputted. Such a process ensures that a classification model can effectively cope with various complex and varying image scenarios during practical applications.

As a preference, the image classification solution includes the seven individuals formed by voting ensemble, and in step 6, image classification prediction is respectively performed on the to-be-classified image data by the seven individuals, the predicted class labels are respectively outputted, and a predicted class label with the highest cumulative count is selected as the image classification result for output.

In the DEGP module, the population continuously optimizes each individual by the evolutionary learning process until the preset upper limit of iterations is reached, and finally returns a group of individuals, and a classification solution is mapped by each individual and is outputted as a predicted class label. Due to the ensemble of the diversified and effective individuals, the classification accuracy can be improved, and the possibility of overfitting can be reduced.

Therefore, the present disclosure provides an ensemble strategy based on an individual difference value is further provided for integrating the output of each individual, thereby achieving a better classification effect; and in this method, by selecting the seven individuals with the maximum difference value to perform the voting ensemble, the outputs of the plurality of individuals are gathered, which ensures that final prediction not only depends on the single solution, thereby effectively improving the classification accuracy and the generalization capability.

The present invention has the beneficial effects that the hierarchical evolutionary learning framework is adopted in the present disclosure to reduce a search space and efficiently find a classification solution.

On the first layer, PEGP is defined, the first-layer learning focuses on image preprocessing and feature extraction so that the feature storage table is constructed. By exploring the diversified and effective feature construction blocks in parallel, this layer can improve the combined generation efficiency of preprocessing and feature extraction in the GP algorithm, and finally output diversified feature blocks as second-stage inputs.

On the second layer, DEGP is defined for combining the feature blocks in a search space under the guidance of a newly defined program structure on the basis of the feature storage table, and generates the ensemble solution. The framework based on hierarchical learning significantly reduces the search space of the GP algorithm, thereby ensuring that key feature information can be captured by the final solution, and a high performance can be maintained even if there are fewer training samples.

In addition, in view of the weaker generalization capability of the GP method when a few-shot image classification task is coped, the ensemble strategy based on the individual difference value is further provided to improve a classification performance.

BRIEF DESCRIPTION OF DRAWINGS

FIG. 5(*a*) is based on the data set CIFAR10, FIG. 5(*b*) is based on the data set FMNIST, FIG. 5(*c*) is based on the data set SVHN, FIG. 5(*d*) is based on the data set ORL.

DETAILED DESCRIPTION OF THE EMBODIMENTS

The present disclosure will be further described in detail below in conjunction with the accompanying drawings and specific examples. The following embodiments or accompanying drawings are intended to describe the present disclosure, rather than to limit the scope of the present disclosure.

Figure 1:
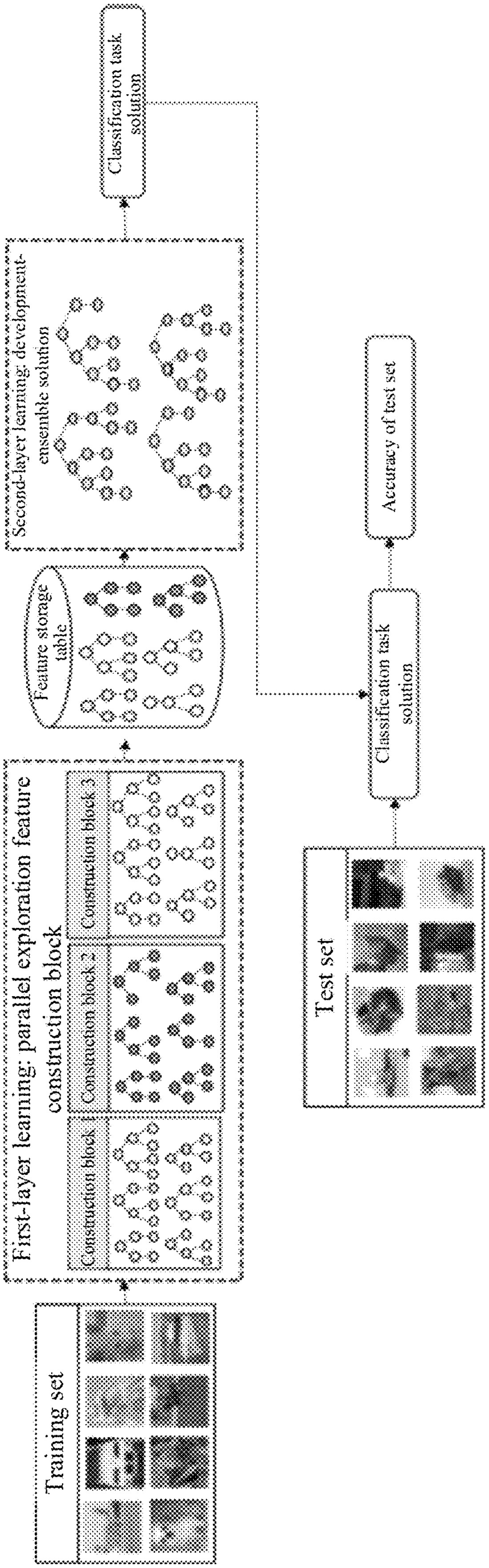
FIG. 1 is a schematic flow diagram of applying an HLGP algorithm to image classification.

As shown in FIG. 1, a few-shot image classification method based on a hierarchical learning genetic programming algorithm includes the following steps:

step 1: a few-shot image classification system based on the hierarchical learning genetic programming algorithm is constructed, wherein the few-shot image classification system is provided with an image acquisition module, the image acquisition module is connected with a hierarchical evolutionary learning framework, and the hierarchical evolutionary learning framework is provided with a PEGP module on a first layer and a DEGP module on a second layer;

step 2: the image acquisition module acquires an image data set, and divides the image data set into a training set and a test set;

step 3: the PEGP module acquires training set data and performs image preprocessing and feature extraction operations on the training set data to construct a feature storage table, and then transfers the feature storage table to the DEGP module;

wherein local features and global features corresponding to image data are stored in the feature storage table;

step 4: the DEGP module further constructs an ensemble solution by using features in the feature storage table as terminal inputs, and finally optimizes a final classification effect by using an ensemble strategy based on an individual difference value, thereby outputting a high-performance image classification solution;

step 5: the test set is used as an input of the image classification solution, then, predicted class labels of the test set are outputted, and finally, a performance of the image classification solution is evaluated according to an actual label of the test set; and step 6: the image acquisition module acquires to-be-classified image data, uses the to-be-classified image data as the input of the image classification solution, and outputs an image classification result.

In step 1, the PEGP module is provided with three different types of feature exploration blocks in parallel, the three feature exploration blocks are respectively a first feature exploration block, a second feature exploration block, and a third feature exploration block, program structures, function sets and terminal sets of the first feature exploration block, the second feature exploration block and the third feature exploration block are respectively set, and the first feature exploration block, the second feature exploration block and the third feature exploration block generate three feature construction blocks with different evolutionary directions in parallel.

The first feature exploration block adopts an LGP algorithm focusing on local features, and the program structure of the first exploration block includes a region extraction layer, a first image filtering layer, a first feature extraction layer, and a first feature concatenation layer. The function set of the first feature exploration block is shown as table 1:

TABLE 1

| Associated layer | Function | Input | Output | Description |
|---|---|---|---|---|
| Region extraction layer | Extracting a rectangular region | Image, coordinate, size, size | Region type | Extracting a rectangular region from image data |
| | Extracting a square region | Image, coordinate, size | Region type | Extracting a square region from image data |
| First image filtering layer | Roberts function | Region type | Region type | Roberts operator for edge detection |
| | Pruitt function | Region type | Region type | Pruitt operator for edge detection |
| | Sobel function | Region type | Region type | Sobel edge detector |
| | Laplace function of Gaussian filter | Region type, $\sigma_2$ | Region type | Laplace operator of Gaussian filter |

TABLE 1-continued

| Associated layer | Function | Input | Output | Description |
|---|---|---|---|---|
| | Laplace function | Region type | Region type | Laplace filter |
| | Gaussian filter function | Region type, $\sigma_1$ | Region type | Gaussian filter |
| | Second-derivative Gaussian filter function | Region type, $\sigma_1$, $o_1$, $o_2$ | Region type | Second-derivative Gaussian filter |
| First feature extraction layer | Histogram-of-oriented-gradient function | Region type | Vector | Extracting histogram-of-oriented-gradient features |
| | Scale-invariant feature transform function | Region type | Vector | Extracting scale-invariant feature transform features |
| | Local binary pattern function | Region type | Vector | Extracting local binary pattern features |
| First feature concatenation layer | Concatenation function | Vector, vector | Vector | Concatenation feature |

The second feature exploration block adopts a GGP algorithm focusing on global features, and the program structure of the second feature exploration block includes a second image filtering layer and a second feature extraction layer.

The function set of the second feature exploration block is shown as table 2:

TABLE 2

| Associated layer | Function | Input | Output | Description |
|---|---|---|---|---|
| Second image filtering layer | Pruitt function | Image | Image | Pruitt operator for edge detection |
| | Square root function | Image | Image | Reading a square root of a pixel in each image |
| | Mean filter function | Image | Image | 3 × 3 mean filter |
| | Minimum filter function | Image | Image | 3 × 3 minimum filter |
| | Maximum filter function | Image | Image | 3 × 3 maximum filter |
| | Mean filter function | Image | Image | 3 × 3 mean filter |
| | Sobel function | Image | Image | Sobel edge detector |
| | Second-order Gaussian filter function | Image, $\sigma_1$, $o_1$, $o_2$ | Image | Second-derivative Gaussian filter |
| Second feature extraction layer | Histogram-of-oriented-gradient function | Image | Vector | Extracting histogram-of-oriented-gradient features |
| | Scale-invariant feature transform function | Image | Vector | Extracting scale-invariant feature transform features |
| | Local binary pattern function | Image | Vector | Extracting local binary pattern features |

The third feature exploration block adopts a CGP algorithm focusing on concatenated features, and the program structure of the third feature exploration block includes a third image filtering layer, a maximum pooling layer, a third feature extraction layer, and a second feature concatenation layer.

The function set of the third feature exploration block is shown as table 3:

TABLE 3

| Associated layer | Function | Input | Output | Description |
|---|---|---|---|---|
| Third image filtering layer | Roberts function | Image | Image | Roberts operator for edge detection |
| | Pruitt function | Image | Image | Pruitt operator for edge detection |

TABLE 3-continued

| Associated layer | Function | Input | Output | Description |
|---|---|---|---|---|
| | Sobel function | Image | Image | Sobel edge detector |
| | Laplace function of Gaussian filter | Image | Image | Laplace operator of Gaussian filter |
| | Laplace filter function | Image | Image | Laplace filter |
| | Gaussian filter function | Image | Image | Gaussian filter |
| | Second-derivative Gaussian filter function | Image | Image | Second-derivative Gaussian filter |
| Maximum pooling layer | Maximum pooling function | Image | Region | Performing a maximum pooling function |
| Third layer extraction feature | Histogram-of-oriented-gradient function | Region type | Vector | Extracting histogram-of-oriented-gradient features |
| | Scale-invariant feature transform function | Region type | Vector | Extracting scale-invariant feature transform features |
| | Local binary pattern function | Region type | Vector | Extracting local binary pattern features |
| Second feature concatenation layer | Concatenation function | Vector, vector | Vector | Concatenation feature |

Figure 4:
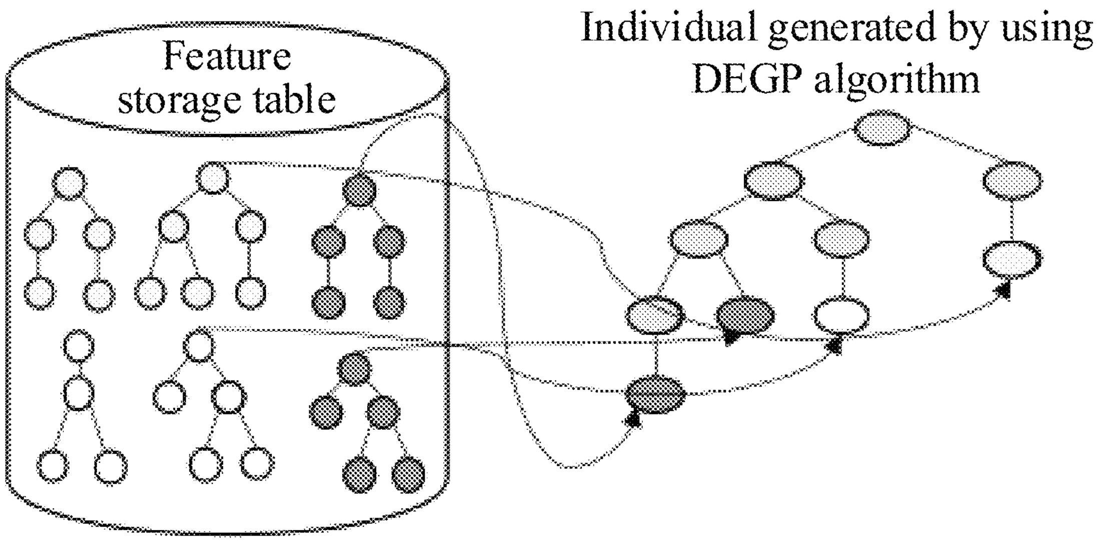
FIG. 4 is an exemplary diagram of an individual generated by using a DEGP algorithm.
Figure 5A:
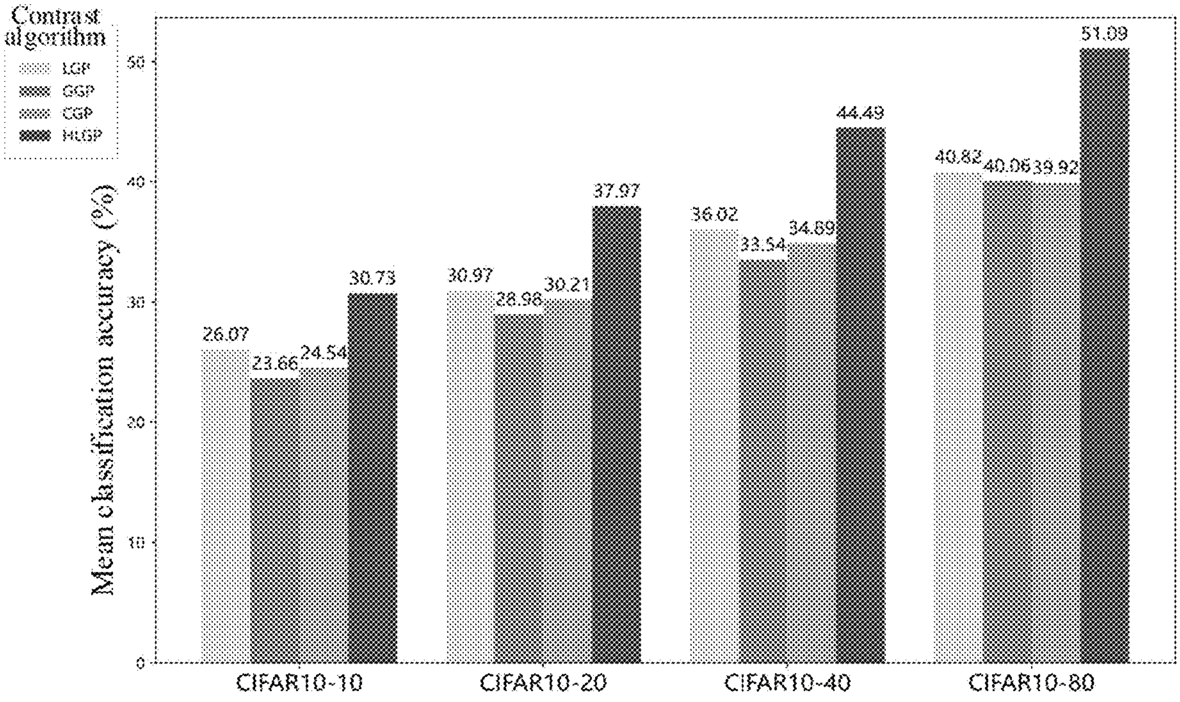
FIG. 5(*a*), FIG. 5(*b*), FIG. 5(*c*), and FIG. 5(*d*) is a comparison diagram of classification accuracy of the HLGP algorithm and three sub-algorithms.
Figure 5B:
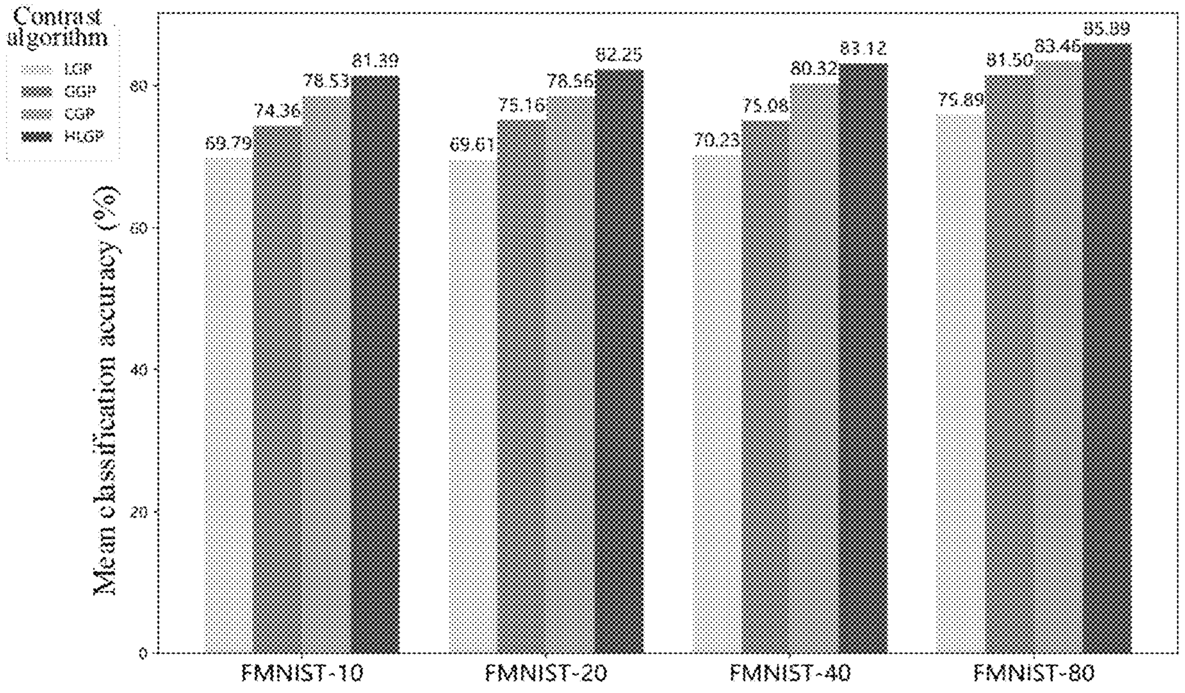
Figure 5C:
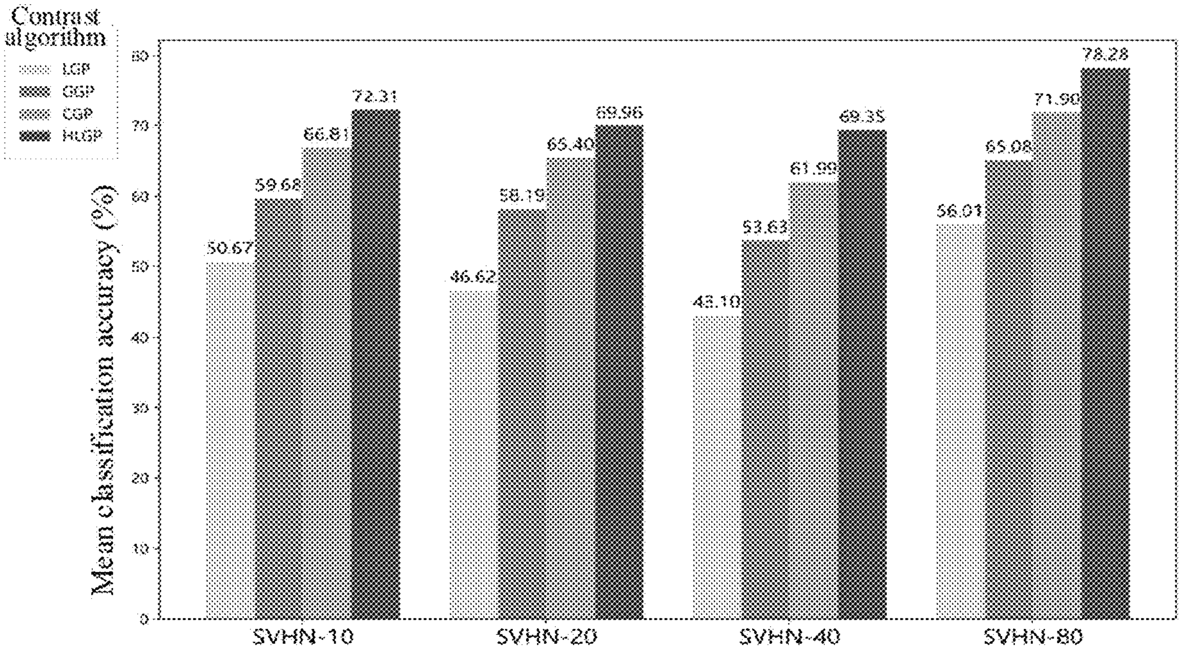
Figure 5D:
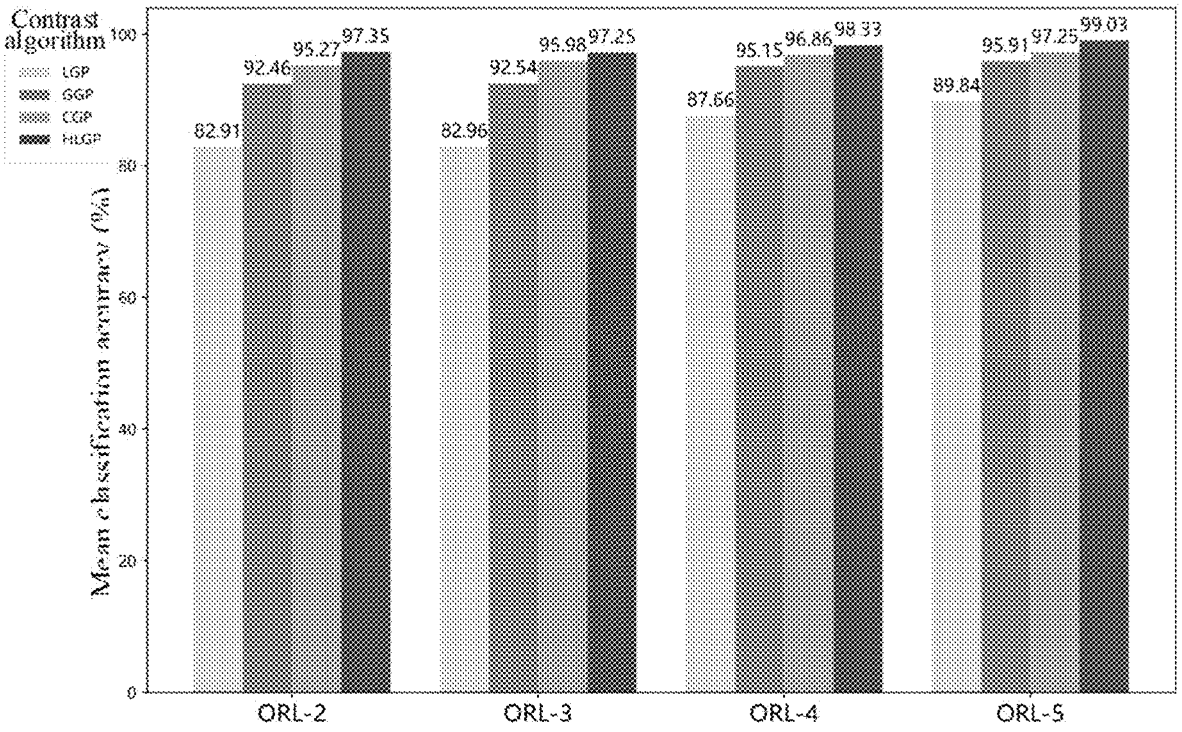

A terminal set of the PEGP module includes a training set and parameters required by functions in the LGP algorithm, the GGP algorithm, and the CGP algorithm, and the specifically required functions are shown as FIG. 4:

TABLE 4

| Terminal | Type | Value range | Description |
|---|---|---|---|
| N images | Array | [0, 1] | N images, each image is expressed as a two-dimensional array represents. |
| $\sigma_1$ | Reshaping | [1, 3] | Standard deviation parameter of Gaussian filter |
| $\sigma_2$ | Reshaping | [1, 2] | Standard deviation parameter for Gaussian filter |
| $\sigma_1$, $\sigma_2$ | Reshaping | [0, 2] | Order of Gaussian derivative |
| Horizontal coordinate | Reshaping | [0, image width-20], | Horizontal coordinate of selected region |
| Vertical coordinate | Reshaping | [0, image height-20] | Vertical coordinate of selected region |
| Size | Reshaping | [20, 50] | Extracting width and height of region |
| k | Reshaping | [2, 4] | Sliding window size required by dimensionality reduction layer |

Figure 2:
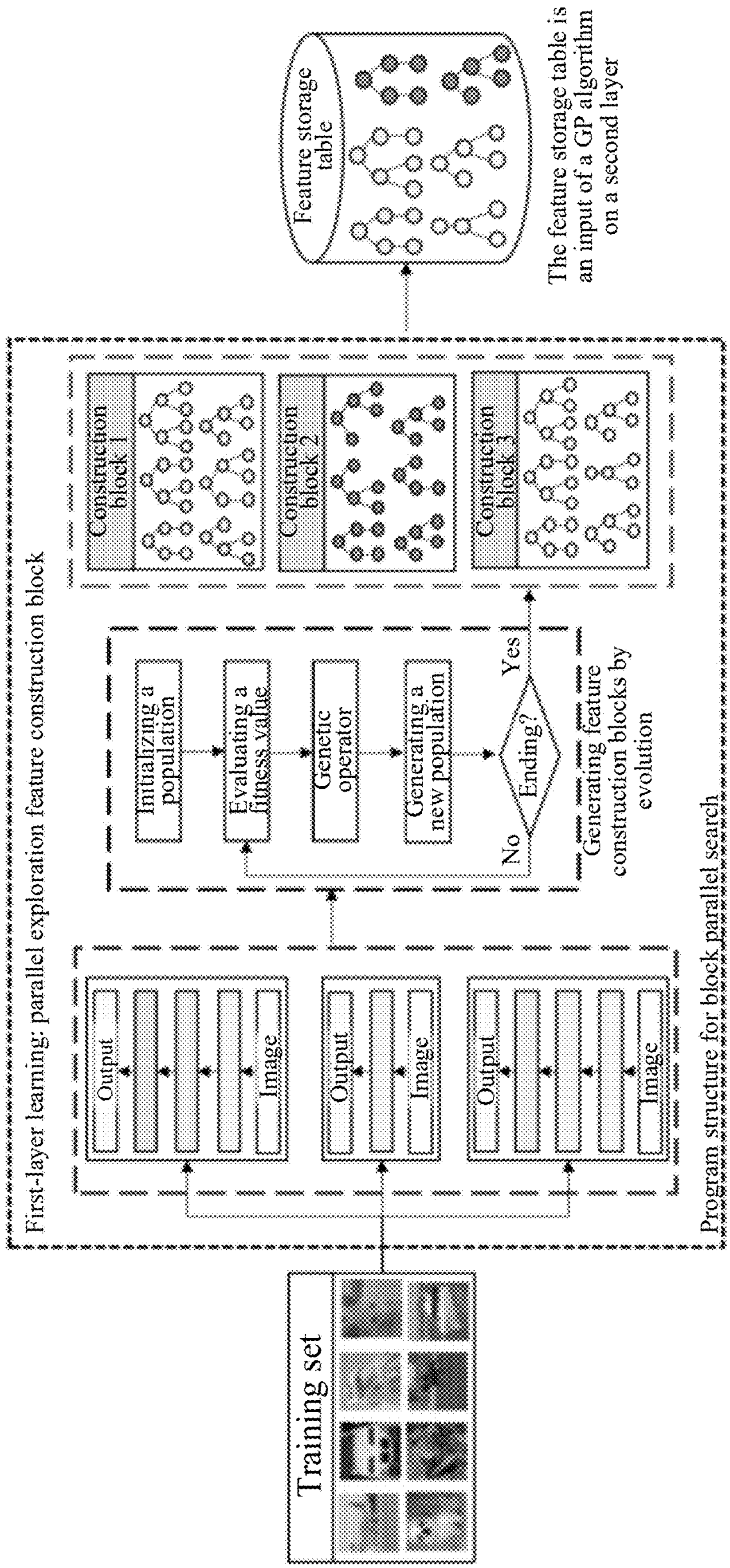
FIG. 2 is a schematic flow diagram of generating feature construction blocks by using a PEGP algorithm.

As shown in FIG. 2, in step 3, the PEGP module constructs the feature storage table, which includes the following steps:

step A1: a population is initialized: the feature exploration blocks acquire the training set data, and initialize a population according to a predetermined program structure, function set and terminal set; wherein each individual in the population may be regarded as a feature extraction algorithm;

step A2: the fitness of an individual is evaluated: each individual in the population extracts features from the training set, and then inputs the extracted features to an SVM, and the SVM outputs the predicted class labels, and then evaluates the individual by adopting a classification accuracy to obtain a fitness value corresponding to the individual;

wherein a computation expression of the classification accuracy is show as follows:

$$\text{Fitness} = \left(\frac{N_{correct}}{N_{total}}\right) \times 100\%$$

wherein $N_{correct}$ is a correctly predicted number of examples, $N_{total}$ is a total number of the examples, and Fitness is the fitness value of the individual;

in this process, in order to reduce the possibility of overfitting, a k-fold cross validation method is adopted. In addition, in order to ensure the sufficiency of cross validation, a value of k is set as a smaller value from the number of each class of training samples n and 10;

step A3: an elite operation is performed: an optimal individual in the population is selected by adopting an elite strategy, and is directly copied to a next-generation population;

step A4: a selection operation is performed: a certain number of individuals are selected from the population by adopting a tournament selection method, wherein each individual has an equal probability of being selected; and an individual with the best fitness value is selected according to the fitness value of each individual to perform crossover and mutation operations to generate a new individual;

step A5: steps A2-A4 are repeated until the maximum number of iterations is reached, and then, step A6 is performed;

step A6: the top 50% of individuals in a final-generation population are selected as the feature construction blocks; and step A7: corresponding features are extracted from the training set by using the feature construction blocks, are numbered, are stored into the feature storage table, and are used as inputs for second-layer learning.

A new program structure, function set and terminal set are set for the DEGP module, and the program structure of the DEGP module includes a feature construction layer, a classification layer, and a combination layer;

the feature construction layer is configured to use at least two features in the feature storage table as inputs and return one concatenated feature or construct new features according to parameters;

the classification layer is configured to use output features of the feature construction layer as inputs and output the predicted class labels; and the combination layer is configured to perform a voting or weighting method by using at least two sets of the predicted class labels outputted by the classification layer as inputs so as to output a new predicted class label.

The function set of the DEGP module is shown as table 5:

TABLE 5

| Associated layer | Function | Input type | Output | Description |
|---|---|---|---|---|
| Feature combination layer | Two image concatenation | A certain feature in the feature storage table | Vector | Respectively accepting 2/3/4 sets of features to be concatenated |
| | Three image concatenation | A certain feature in the feature storage table | Vector | |
| | Four image concatenation | A certain feature in the feature storage table | Vector | |
| | Two image feature addition | A certain feature in the feature storage table, i | Vector | Accepting two features and constructing features |
| Classification layer | Support vector machine | Vector | Label | Outputting predicted class labels according to a support vector machine algorithm |
| | Logistic regression classifier | Vector | Label | Outputting predicted class labels according to a logistical regression algorithm |
| Combination layer | Three image concatenation | Label | New label | Respectively accepting 3/5/7 sets of labels to generate new labels |
| | Five image concatenation | Label | New label | |
| | Seven image concatenation | Label | New label | |
| | Weighting function | Label | New label | Accepting three sets of labels to perform weight fusion |
| | Combination function | New label | New label | Recombining a generated new table |

Figure 3:
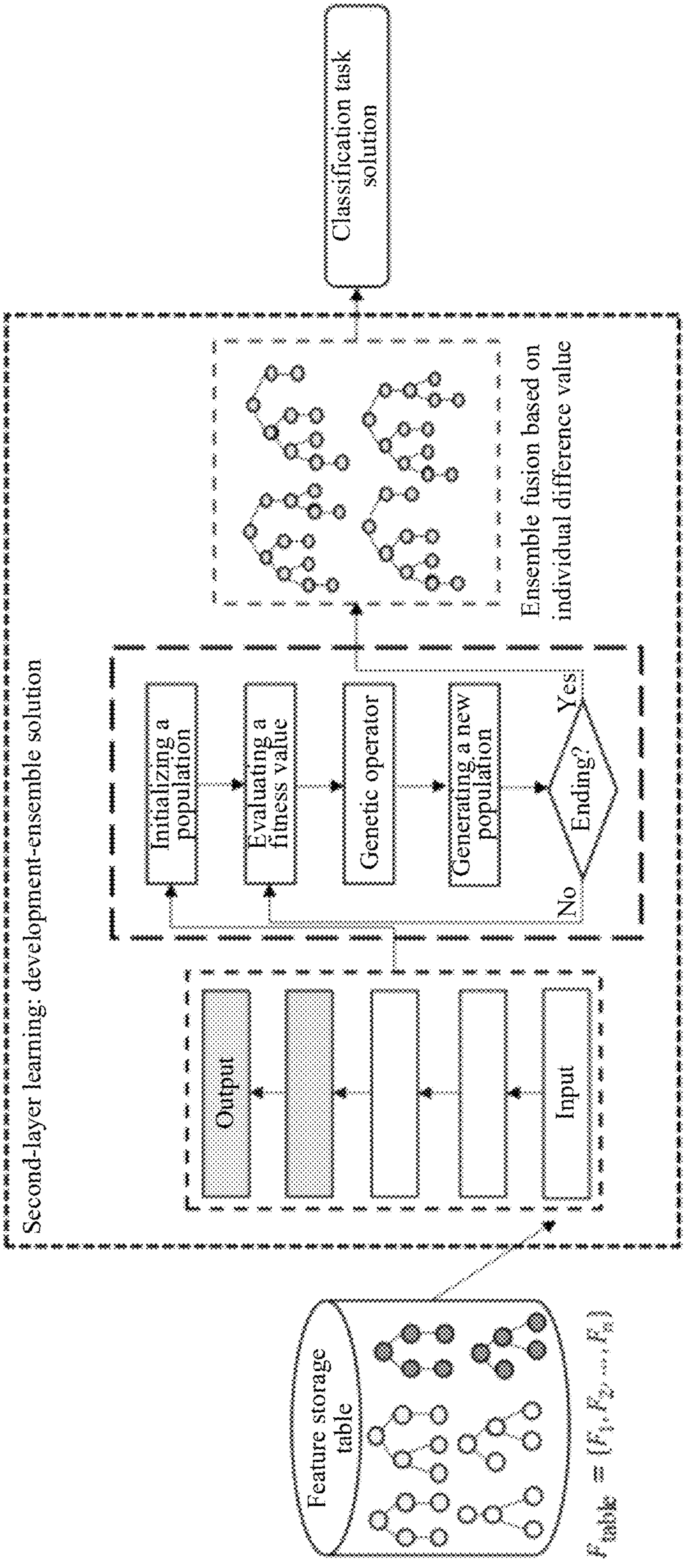
FIG. 3 is a schematic flow diagram of generating a classification solution by using a DEGP algorithm.

As shown in FIG. 3, in step 4, the DEGP module further constructs the ensemble solution, which includes the following steps:

(1) Population Evolutionary Learning step B1: a population is initialized: the DEGP module acquires the features in the feature storage table, and initializes a population according to a new program structure, function set and terminal set, wherein a classification solution is mapped by each individual in the population and is outputted as a predicted class label;

step B2: the fitness of an individual is evaluated: each individual in the population extracts the features from the feature storage table, outputs the predicted class labels, and then evaluates a fitness value of the individual;

step B3: an elite operation is performed: an optimal individual in the population is selected by adopting an elite strategy, and is directly copied to a next-generation population;

step B4: a selection operation is performed: a certain number of individuals are selected from the population by adopting a tournament selection method, and an individual with the best fitness value is selected according to the fitness value of each individual to perform crossover and mutation operations to generate a new individual;

step B5: steps B2-B4 are repeated until a preset upper limit of iterations is reached, and then, step B6 is performed;

(2) Ensemble Strategy Based on Individual Difference Value step B6: an individual with an optimal performance in the final-generation population is selected as a benchmark, a difference value of other individuals in the population is computed, and feature differences of the optimal individual and other individuals in the population are evaluated according to the computed difference value;

wherein an adopted difference value computation method is to determine whether feature types of terminal nodes of these individuals are identical, and these terminal nodes represent different features selected from the feature storage table. Expressions of the individuals may be expressed as a series of character strings, in which a terminal includes different feature vectors in the feature storage table. The expressions of the individuals are traversed to count the number $S_i$ of times of concurrence of the different feature vectors. An expression of the computed difference value is shown as follows:

$$D(\text{best}, i) = |S_{best} \cup S_i| - |S_{best} \cap S_i|$$

wherein $S_{best}$ represents the number of feature labels of the optimal individual in the population, D represents the difference value, and $S_i$ represents the number of feature labels of other individuals in the population;

feature differences of two individuals are determined by computing a symmetric difference of two sets, i.e., the number of elements only existing one set. Such computation directly reflects the differences of two individuals in term of feature selection. If the two individuals have completely identical features, the difference value will be zero; and if they have no common features, the difference value will be equal to the sum of the number of all unique elements in the two sets; and step B7: seven individuals with the maximum difference value $S_{best}$ are selected to perform voting ensemble to obtain the image classification solution.

The image classification solution includes the seven individuals formed by voting ensemble, and in step 6, image classification prediction is respectively performed on the to-be-classified image data by the seven individuals, the predicted class labels are respectively outputted, and a predicted class label with the highest cumulative count is selected as the image classification result for output.

FIG. 4 shows an example of an individual generated by using a DEGP algorithm. It can be seen from FIG. 4 that features are randomly selected as inputs thereof from the feature storage table by using the DEGP algorithm to perform second-layer evolutionary learning. For the DEGP algorithm, outputs of the generated individuals are the predicted class labels generated according to functions of the combination layer, and a fitness function is also the classification accuracy computed by k-fold cross validation on the training set.

Next, the classification performance of the present disclosure will be further tested by specific experiments.

1. Data Set

In the present embodiment, the performance of the few-shot image classification method based on the hierarchical learning genetic programming algorithm is evaluated on four different image data sets. CIFAR10 is a widely-used object classification data set including 50,000 32×32 training images and 10,000 test images in 10 types. Fashion_MNIST, FMNIST for short, is an image classification task for dividing images into 10 fashion types, and this data set includes 60,000 28×28-gray training images and 10,000 test images. SVHN is a digital classification data set including 10 classes and consisting of 73,257 32×32 color training images and 26,032 test images. ORL is a face recognition data set including 40 different individuals, each individual has 10 different images with sizes of 92×112 pixels. In the present embodiment, the sizes of the images are set as 46×56.

For the problem of few-shot image classification, 10, 20, 40 and 80 images in each class are randomly selected as training data from the data sets CIFAR10, FMNIST, and SVHN. 2, 3, 4 and 5 training images are respectively used for each class in the data set ORL. This design aims at testing the performance of the present disclosure in the case that training samples are extremely limited.

2. Benchmark Method

In order to test the effectiveness of an HLGP algorithm in term of the problem of few-shot image classification, in the present embodiment, the HLGP algorithm is compared with various benchmark methods. A compared method includes the current advanced GP algorithm and the most advanced deep learning method based on a benchmark data set.

(1) GP-based image classification method: all the data sets are compared by using three GP-based methods so that the effectiveness of the mentioned methods is shown. These methods are respectively a genetic programming image classification method FGP based on an image related operation and a flexible program structure, a genetic programming feature learning method FLGP based on image description, and a genetic programming image classification method BERGP based on block evolution and reuse. The three methods automatically learn different types of features and/or evolve effective image classification ensemble by using different individual expressions, and achieve satisfied results on the different image data sets. At the same time, in order to prove the effectiveness of hierarchical learning, this method is compared with three GP algorithms for first-layer learning.

(2) Deep learning method: the most advanced method for CIFAR10, FMNIST and SVHN is a method based on convolutional neural networks (CNNs) and a deep residual network ResNet20 under research. According to the complexity of a network architecture, adopted CNN models are divided into three classes: a low-complexity CNN (CNN-lc), a medium-complexity CNN (CNN-mc), and a high-complexity CNN (CNN-hc). These complexities are mainly different in the number of filters in a convolutional layer and the depth of a network layer. In addition, performances of the three classes of models at different discard rates (0, 0.4, 0.7) are further researched, and the effect of preventing overfitting in the case of few samples is explored.

3. Parameter Setting

In order to ensure the comparability of experimental results, in the GP-based compared methods, all the algorithms are set as follows: the maximum number of generations is set as 50, the population size is set as 100, the elite rate is set as 0.01, the mutation rate is set as 0.19, and the crossover rate is set as 0.8. The adopted selection method is tournament selection with a size of 5. the minimum depth and the maximum depth of trees of FGP, FLGP and BERGP are respectively set as 2 and 8. For the HLGP algorithm, first-layer evolutionary learning, including the LGP, GGP and CGP algorithms, is set to have a population size of 250 and a maximum number of generations of 10 so as to explore diversified solution sets; the DEGP algorithm for second-layer evolutionary learning is set to have a population size of 100 and a maximum number of generations of 25 so as to accelerate convergence and keep the same number of evaluations as other GP algorithms. In each method, independent operation is performed for 30 times on each training set by using different random seeds so that the stability thereof is elevated. The mean accuracy and standard deviation on the test set will be reported by the experimental results.

4. Classification Performance Analysis

The HLGP algorithm is compared with CNNs and ResNet-20 with different complexities and discard rates and other advanced GP-based image classification methods so as to be analyzed.

(1) Comparison with CNNs, ResNet-20 and BERGP algorithms: in view of the BERGP method only providing mean accuracy data and being lack of detailed iterative data, this variant cannot be brought to a subsequent rank sum test, and therefore, the BERGP method performs reporting together with the CNNs method, and table 6 to table 8 show performance comparison results of the benchmark method and the HLGP algorithm.

TABLE 6

| performance comparison on data set CIFAR-10 | | | | |
|---|---|---|---|---|
| Algorithm | CIFAR10-10 Mean | CIFAR10-20 Mean | CIFAR10-40 Mean | CIFAR10-80 Mean |
| CNN-lc | 27.1+ | 32.4+ | 36.1+ | 41.8+ |
| CNN-lc-0.4 | 29.7+ | 33.8+ | 38.2+ | 43.5+ |
| CNN-lc-0.7 | 29.7+ | 34.9+ | 40.0+ | 44.9+ |
| CNN-mc | 28.5+ | 34.3+ | 38.8+ | 43.0+ |
| CNN-mc-0.4 | 29.7+ | 34.9+ | 39.9+ | 45.4+ |
| CNN-mc-0.7 | 31.5− | 36.2+ | 41.3+ | 47.1+ |
| CNN-hc | 30.1+ | 34.2+ | 39.1+ | 44.7+ |
| CNN-hc-0.4 | 31.7− | 36.1+ | 40.8+ | 46.5+ |
| CNN-hc-0.7 | 31.9− | 37.0+ | 42.5+ | 48.1+ |
| ResNet-20 | 23.3+ | 29.0+ | 31.9+ | 38.5+ |
| BERGP | 30.6+ | 35.3+ | 44.8= | 49.7+ |
| HLGP | 30.7 | 37.9 | 45.9 | 51.1 |
| Overall (+/=/−) | 8+, 3− | 11+ | 11+ | 11+ |

On the data set CIFAR-10 in table 6, compared with the benchmark method for 44 times, the HLGP is superior to the benchmark method in 41 comparisons, and is inferior to the contrast algorithm in three comparisons of CIFAR10-10. As a diversified few-shot image data set, CIFAR10 has the image resolution and the number of samples, that pose a greater challenge to the performance of the classification model, especially in the case that the number of the samples is smaller. The HLGP effectively copes with this challenge by a hierarchical learning strategy. By exploring and combining features at different hierarchies by using this strategy, the algorithm can find more effective discriminant features in less data, thereby improving the accuracy of classification. For example, in CIFAR10-10 under the condition of minimum samples, the HLGP achieves the accurate rate of 30.7% that is slightly higher than 30.6% as the accurate rate of BERGP and significantly superior to 23.3% as the accurate rate of ResNet-20. In CIFAR10-80 with a higher sample configuration, the performance of the HLGP is further improved to 51.1% that is higher than 49.7% as the performance of BERGP. This performance improvement proves the capability of the HLGP effectively extracting key features by the hierarchical learning strategy in the case that few samples are processed, especially under a low sample condition, compared with an advanced CNNs model and an image classification method based on a GP algorithm, the HLGP can better adapt to the limitation on the number of the samples, thereby achieving a higher classification accuracy and a higher generalization performance.

TABLE 7

| performance comparison on data set FMNIST | | | | |
|---|---|---|---|---|
| Algorithm | FMNIST-10 Mean | FMNIST-20 Mean | FMNIST-40 Mean | FMNIST-80 Mean |
| CNN-lc | 71.1+ | 74.0+ | 77.8+ | 81.0+ |
| CNN-lc-0.4 | 71.2+ | 76.1+ | 79.8+ | 81.9+ |
| CNN-lc-0.7 | 71.3+ | 75.6+ | 78.7+ | 81.6+ |
| CNN-mc | 72.5+ | 75.5+ | 79.0+ | 82.0+ |
| CNN-mc-0.4 | 72.4+ | 76.1+ | 79.6+ | 82.9+ |
| CNN-mc-0.7 | 72.5+ | 76.9+ | 79.9+ | 82.9+ |
| CNN-hc | 71.9+ | 75.9+ | 80.1+ | 82.3+ |
| CNN-hc-0.4 | 72.2+ | 76.3+ | 80.2+ | 83.0+ |
| CNN-hc-0.7 | 73.3+ | 77.4+ | 80.5+ | 83.2+ |
| ResNet-20 | 62.3+ | 71.4+ | 77.0+ | 80.4+ |
| BERGP | 72.1+ | 78.6− | 82.1+ | 83.4+ |

TABLE 7-continued

| performance comparison on data set FMNIST | | | | |
|---|---|---|---|---|
| Algorithm | FMNIST-10 Mean | FMNIST-20 Mean | FMNIST-40 Mean | FMNIST-80 Mean |
| HLGP | 75.8 | 81.5 | 83.4 | 85.8 |
| Overall (+/=/−) | 11+ | 11+ | 11+ | 11+ |

On the data set FMNIST in table 7, compared with various benchmark methods for 44 times, the HLGP algorithm is superior to the benchmark methods in the 44 comparisons. As a gray image data set involving fashion item classification, Fashion-MNIST poses great challenges to classification algorithms, especially when the number of the samples is limited. The HLGP effectively copes with these challenges by a unique hierarchical learning strategies, and by exploring and integrating features at different hierarchies by using this strategy, the algorithm can also find features with stronger discriminability even if the data size is not large, thereby improving the accuracy of classification. For example, in FMNIST-10 with the minimum sample configuration, the HLGP achieves the accurate rate of 75.8% that not only exceeds performances of most of CNN models, but also is significantly superior to 72.1% as the accurate rate of BERGP. In FMNIST-80 with a higher sample configuration, the performance of the HLGP is further improved to 85.8% that further maintains a lead over BERGP (83.4%). Such a series of results not only show advantages of the HLGP in term of coping the problem of few samples, but also highlight performance improvement brought for diversified image data sets by a hierarchical learning framework.

TABLE 8

| performance comparison on data set SVHN | | | | |
|---|---|---|---|---|
| Algorithm | SVHN-10 Mean | SVHN-20 Mean | SVHN-40 Mean | SVHN-80 Mean |
| CNN-lc | 25.3+ | 37.5+ | 50.5+ | 64.1+ |
| CNN-lc-0.4 | 28.4+ | 44.9+ | 59.0+ | 70.2+ |
| CNN-lc-0.7 | 28.8+ | 46.7+ | 60.6+ | 72.1+ |
| CNN-mc | 26.8+ | 39.9+ | 53.4+ | 68.6+ |
| CNN-mc-0.4 | 29.6+ | 43.3+ | 64.3+ | 72.1+ |
| CNN-mc-0.7 | 27.7+ | 45.8+ | 64.1+ | 74.6+ |
| CNN-hc | 24.9+ | 37.5+ | 55.5+ | 67.7+ |
| CNN-hc-0.4 | 27.5+ | 45.6+ | 63.1+ | 73.6+ |
| CNN-hc-0.7 | 28.8+ | 44.8+ | 64.7+ | 74.4+ |
| ResNet-20 | 20.3+ | 40.0+ | 54.7+ | 74.1+ |
| BERGP | 60.2+ | 69.8+ | 74.0+ | 77.1+ |
| HLGP | 59.2 | 69.9 | 77.3 | 78.2 |
| Overall (+/=/−) | 10+, 1− | 11+ | 11+ | 11+ |

On the data set SVHN in table 8, compared with various benchmark methods, the HLGP algorithm shows significant performance advantages. The data set SVHN is known for its wide range of digital images of street views, and digital diversity and background noise in the images pose higher challenges to a classification algorithm. By feature exploration and combination optimization, the HLGP algorithm effectively improves the processing capability for this kind of complex images. In SVHN-10 with the minimum sample configuration, the HLGP has a performance slightly lower than that of BERGP, and achieves the accurate rate of 59.2%, and the accurate rate of BERGP is 60.2%. However, with the increase of the number of the samples, the performance of the HLGP begins to exceed that of BERGP and other CNNs-based methods. In settings of SVHN-20, SVHN-40 and SVHN-80, the HLGP respectively achieves the accurate rates of 69.9%, 77.3%, and 78.2%, which shows that the classification performance is also improved synchronously when the number of the samples is increased. Compared with the CNNs model, the HLGP shows its superiority. For example, in SVHN-80, the highest accurate rate of the CNNs model is 74.6%, and the highest accurate rate of the HLGP reaches 78.2%. Such performance improvement is due to the adoption of the ensemble strategy based on the individual difference value in the HLGP, which significantly improves the excellent generalization capability on diversified data.

(2) Comparison with a GP-based method: in comparison with the GP-based method, the significance of performance improvement is shown by a Wilcoxon rank sum test with a significance level of 5%. In such a link, GP method variants providing complete data (including a result of each cycle) are focused. The rank sum test will help to statistically test performance differences of all the variants, thereby providing a scientific basis for final method selection. The comparison with the GP-based method is shown in table 9.

TABLE 9 result of comparison with GP-based method on each data set

| Data set | FGP (Mean ± Std) | FLGP (Mean ± Std) | LGP (Mean ± Std) | GGP (Mean ± Std) | CGP (Mean ± Std) | HLGP (Mean ± Std) |
|---|---|---|---|---|---|---|
| CIFAR10-10 | 28.56 ± 2.65 | 23.06 ± 1.68 | 26.07 ± 3.61 | 23.66 ± 2.37 | 24.54 ± 3.04 | 30.73 ± 2.77 |
| CIFAR10-20 | 32.46 ± 2.15 | 25.77 ± 2.20 | 30.97 ± 2.20 | 28.98 ± 1.80 | 30.21 ± 2.25 | 37.97 ± 2.08 |
| CIFAR10-40 | 39.94 ± 1.99 | 33.49 ± 1.37 | 36.02 ± 1.66 | 33.54 ± 1.59 | 34.89 ± 2.44 | 44.49 ± 1.88 |
| CIFAR10-80 | 45.74 ± 1.29 | 37.51 ± 1.33 | 40.82 ± 1.30 | 40.06 ± 1.40 | 39.92 ± 1.53 | 51.09 ± 1.37 |
| FMNIST-10 | 73.19 ± 2.24 | 69.79 ± 2.43 | 69.79 ± 2.43 | 69.61 ± 3.06 | 70.23 ± 2.24 | 75.89 ± 2.27 |
| FMNIST-20 | 77.00 ± 1.52 | 74.92 ± 1.48 | 74.36 ± 1.81 | 75.16 ± 1.68 | 75.08 ± 1.81 | 81.50 ± 2.04 |
| FMNIST-40 | 81.07 ± 0.98 | 78.53 ± 1.17 | 78.53 ± 1.17 | 78.56 ± 0.94 | 80.32 ± 1.34 | 83.46 ± 1.17 |
| FMNIST-80 | 83.35 ± 0.65 | 80.85 ± 0.71 | 81.39 ± 0.83 | 82.25 ± 0.89 | 83.12 ± 1.09 | 85.89 ± 0.74 |
| SVHN-10 | 48.96 ± 4.83 | 44.34 ± 3.68 | 50.67 ± 4.73 | 46.62 ± 4.60 | 43.10 ± 3.69 | 56.01 ± 4.29 |
| SVHN-20 | 57.14 ± 3.31 | 54.97 ± 2.19 | 59.68 ± 3.26 | 58.19 ± 2.97 | 53.63 ± 2.44 | 65.08 ± 2.06 |
| SVHN-40 | 66.78 ± 2.03 | 62.79 ± 0.58 | 66.81 ± 2.52 | 65.40 ± 2.04 | 61.99 ± 2.12 | 71.90 ± 2.16 |
| SVHN-80 | 72.43 ± 1.47 | 68.54 ± 1.02 | 72.31 ± 1.45 | 69.96 ± 0.90 | 69.35 ± 1.46 | 78.28 ± 0.68 |
| ORL-2 | 89.90 ± 3.63 | 85.16 ± 4.94 | 82.91 ± 4.94 | 82.96 ± 2.75 | 87.66 ± 4.06 | 89.84 ± 2.31 |
| ORL-3 | 92.91 ± 2.33 | 92.95 ± 2.79 | 92.46 ± 1.98 | 92.54 ± 2.31 | 95.15 ± 2.10 | 95.91 ± 1.92 |
| ORL-4 | 97.58 ± 1.31 | 95.72 ± 2.36 | 95.27 ± 2.33 | 95.98 ± 1.99 | 96.86 ± 1.81 | 97.25 ± 1.84 |
| ORL-5 | 99.03 ± 1.04 | 97.46 ± 1.44 | 97.35 ± 1.28 | 97.25 ± 1.38 | 98.33 ± 0.65 | 99.03 ± 0.88 |

Mean classification performance indexes of the HLGP and the GP-based image classification method are statistically compared under the significance level of 5% obtained by using the Wilcoxon rank sum test, and results are summarized in table 10. It can be seen from this table that, in 80 performance comparisons, the HLGP is significantly superior to the compared method in 78 comparisons, and has the equivalent performance with the compared method in 2 comparisons. Such a result clearly shows that the performance of the HLGP on a plurality of data sets is superior to that of a traditional method when the problem of image classification is coped, which highlights the effectiveness and stability of the method. This advantage is not only embodied in the improvement of the classification accuracy, but also embodied in the good generalization capability for different types and sizes of data sets.

TABLE 10 statistical test with GP-based method on mean classification accuracy

| Mean classification accuracy | FGP | FLGP | LGP | GCP | CGP |
|---|---|---|---|---|---|
| +/=/− | 14/2/0 | 16/0/0 | 16/0/0 | 16/0/0 | 16/0/0 |

Compared with the FGP algorithm, the HLGP shows a better performance in 14 comparisons, and only shows poorer performance than the FGP in two comparisons. The performance of the HLGP exceeds that of the FGP especially in term of processing the complex data sets CIFAR10, FMNIST, and SVHN, which mainly benefits from a double-layer learning framework of the HLGP, and this framework not only improves the flexibility of the algorithm, but also improves the overall quality of the solution. At a first-layer learning stage of the HLGP, the feature information in the data is effectively captured by constructing the diversified feature construction blocks. Then, in second-layer learning, these features are configured to construct the ensemble solution, which further optimizes the classification result. The solution generated based on this is obviously superior to a solution generated by using a single-layer learning method, which is also a main reason why the HLGP exceeds the FGP on these data sets.

Compared with the FLGP algorithm, the HLGP algorithm shows a better performance in 16 comparisons. The program structure of the FLGP focuses on capturing the local and global features of the image at the same time, and the HLGP effectively reduces a search space and optimizes a feature exploration process by applying the LGP and GGP algorithms as the program structure in parallel in the first-layer learning. By using this strategy, the HLGP can more accurately recognize useful features when coping with complex image classification tasks, thereby being significantly superior to the FLGP on various data sets, and showing the efficient feature learning and solution construction capability.

The HLGP is significantly superior to the LGP, the GGP and the CGP in 48 comparisons. In the first-layer learning, each of the LGP, the GGP and the CGP independently extracts a kind of features for image classification. This single feature extraction method has a poor performance in most cases, especially in an image classification task requiring complex feature fusion. Specifically, on most of data sets, performances of the LGP, the GGP and the CGP are inferior to the performance of the FGP or the FLGP. By means of the second-layer evolutionary learning of the HLGP, these primarily extracted features are further combined and optimized, which significantly improves the final classification effect. Such a result clearly shows that the hierarchical learning structure adopted by the HLGP is effective in term of improving the performance of the algorithm.

In order to further explain the effectiveness of the hierarchical learning designed by the HLGP, it is necessary to compare three GP sub-algorithms designed in the first-layer learning with the overall HLGP algorithm. By this comparison, improvement brought by the hierarchical learning can be obviously seen, which is specifically shown as FIG. 5(*a*), FIG. 5(*b*), FIG. 5(*c*), and FIG. 5(*d*).

It can be seen from statistical data in FIG. 5(*a*), FIG. 5(*b*), FIG. 5(*c*), and FIG. 5(*d*) that the three GP sub-algorithms designed at the first stage all achieve good effects, and respectively show different classification results. Even so, the HLGP with the hierarchical learning framework obviously exceeds the three sub-algorithms in term of overall performance. The only exception appears on the data set ORL, wherein the performance improvement of the HLGP is not as significant as that in other data sets, which may be due to a fact that the classification task of the data set ORL is relatively simple, and the HLGP is mainly designed for coping image classification tasks with higher complexity and a limited number of samples. In conclusion, when complex and challenging classification tasks, such as the problem of few-shot image classification, are coped, the hierarchical learning framework can significantly improve the performance.

The present disclosure focuses on solving the problem of few-shot image classification, and provides the HLGP algorithm. This method is divided into two hierarchies: the first hierarchy mainly focuses on image preprocessing and feature extraction, and aims at constructing the efficient feature storage table; and the second hierarchy focuses on selecting high-quality features optimized by learning and developing the ensemble solution under the guidance of the program structure. The hierarchical learning framework successfully reduces the search space of the GP algorithm, and generates the excellent ensemble solution. By using the proposed ensemble solution based on the individual difference value, secondary ensemble is performed on a plurality of ensemble solutions by elevating the differences of the individuals. This method enhances the final classification performance by not only utilizing the uniqueness of each individual in the algorithm, but also combining the diversified solutions. Finally, after comparison with a plurality of advanced contrast algorithms, experimental results show that the HLGP algorithm is superior to all the contrast algorithms in the case that the number of the samples is limited. These results show that the HLGP is an efficient method when coping with the problem of few-shot image classification, and has the capability of achieving accurate classification in complex classification tasks.

The above descriptions are only preferred embodiments of the present disclosure, but are not intended to limit the present disclosure. Various alterations and changes can be made on the present disclosure by the skilled in the art. Any modifications, equivalent substitutions, improvements and the like made within the spiral and principle of the present disclosure shall fall within the protection scope of the present disclosure.

What is claimed is:

1. A few-shot image classification method based on a hierarchical learning genetic programming algorithm, comprising the following steps:

step 1: constructing a few-shot image classification system based on the hierarchical learning genetic programming algorithm, wherein the few-shot image classification system is provided with an image acquisition module, the image acquisition module is connected with a hierarchical evolutionary learning framework, and the hierarchical evolutionary learning framework is provided with a parallel exploration genetic programming (PEGP) module on a first layer and a development-ensemble genetic programming (DEGP) module on a second layer;

the PEGP module is provided with three different types of feature exploration blocks in parallel, the three feature exploration blocks are respectively a first feature exploration block, a second feature exploration block, and a third feature exploration block, program structures, function sets and terminal sets of the first feature exploration block, the second feature exploration block and the third feature exploration block are respectively set, and the first feature exploration block, the second feature exploration block and the third feature exploration block generate three feature construction blocks with different evolutionary directions in parallel;

step 2: acquiring an image data set, and dividing the image data set into a training set and a test set by the image acquisition module;

step 3: acquiring training set data, and performing image preprocessing and feature extraction operations on the training set data to construct a feature storage table, and then transferring the feature storage table to the DEGP module by the PEGP module;

step 4: further constructing an ensemble solution by using features in the feature storage table as terminal inputs, and finally optimizing a final classification effect by using an ensemble strategy based on an individual difference value by the DEGP module, thereby outputting a high-performance image classification solution;

step 5: using the test set as an input of the image classification solution, then, outputting predicted class labels of the test set, and finally, evaluating a performance of the image classification solution according to an actual label of the test set; and step 6: acquiring to-be-classified image data, using the to-be-classified image data as the input of the image classification solution, and outputting an image classification result by the image acquisition module.

2. The few-shot image classification method based on a hierarchical learning genetic programming algorithm of claim 1, wherein the first feature exploration block adopts a linear genetic programming (LGP) algorithm focusing on local features, and the program structure of the first exploration block comprises a region extraction layer, a first image filtering layer, a first feature extraction layer, and a first feature concatenation layer;

the second feature exploration block adopts a grammar-guided genetic programming (GGP) algorithm focusing on global features, and the program structure of the second feature exploration block comprises a second image filtering layer and a second feature extraction layer; and the third feature exploration block adopts a Cartesian genetic programming (CGP) algorithm focusing on concatenated features, and the program structure of the third feature exploration block comprises a third image filtering layer, a maximum pooling layer, a third feature extraction layer, and a second feature concatenation layer.

3. The few-shot image classification method based on a hierarchical learning genetic programming algorithm of claim 2, wherein a terminal set of the PEGP module comprises a training set and parameters required by functions in the LGP algorithm, the GGP algorithm, and the CGP algorithm.

4. The few-shot image classification method based on a hierarchical learning genetic programming algorithm of claim 1, wherein in step 3, the PEGP module constructs the feature storage table, which comprises the following steps:

step A1: initializing a population: acquiring the training set data, and initializing a population by the feature exploration blocks according to a predetermined program structure, function set and terminal set;

step A2: evaluating the fitness of an individual: extracting features from the training set, and then inputting the extracted features to a support vector machine (SVM) by each individual in the population, and outputting the predicted class labels, and then evaluating the individual by the SVM by adopting a classification accuracy to obtain a fitness value corresponding to the individual; wherein a computation expression of the classification accuracy is show as follows:

$$\text{Fitness} = \left(\frac{N_{correct}}{N_{total}}\right) \times 100\%$$

wherein $N_{correct}$ is a correctly predicted number of examples, $N_{total}$ is a total number of the examples, and Fitness is the fitness value of the individual;

step A3: performing an elite operation: selecting an optimal individual in the population by adopting an elite strategy, and directly copying the optimal individual to a next-generation population;

step A4: performing a selection operation: selecting a certain number of individuals from the population by adopting a tournament selection method, wherein each individual has an equal probability of being selected; and selecting an individual with the best fitness value according to the fitness value of each individual to perform crossover and mutation operations to generate a new individual;

step A5: repeating steps A2-A4 until a maximum number of iterations is reached, and then, performing step A6;

step A6: selecting the top 50% of individuals in a final-generation population as the feature construction blocks; and step A7: extracting corresponding features from the training set by using the feature construction blocks, numbering the features, storing the features into the feature storage table, and using the features as inputs for second-layer learning.

5. The few-shot image classification method based on a hierarchical learning genetic programming algorithm of claim 1, wherein a new program structure, function set and terminal set are set for the DEGP module, and the program structure of the DEGP module comprises a feature construction layer, a classification layer, and a combination layer;

the feature construction layer is configured to use at least two features in the feature storage table as inputs and return one concatenated feature or construct new features according to parameters;

the classification layer is configured to use output features of the feature construction layer as inputs and output the predicted class labels; and the combination layer is configured to perform a voting or weighting method by using at least two sets of the predicted class labels outputted by the classification layer as inputs so as to output a new predicted class label.

6. The few-shot image classification method based on a hierarchical learning genetic programming algorithm of claim 5, wherein in step 4, the DEGP module further constructs the ensemble solution, which comprises the following steps:

(1) population evolutionary learning step B1: initializing a population: acquiring the features in the feature storage table, and initializing a population by the DEGP module according to a new program structure, function set and terminal set;

step B2: evaluating the fitness of an individual: extracting the features from the feature storage table, outputting the predicted class labels, and then evaluating a fitness value of the individual by each individual in the population;

step B3: performing an elite operation: selecting an optimal individual in the population by adopting an elite strategy, and directly copying the optimal individual to a next-generation population;

step B4: performing a selection operation: selecting a certain number of individuals from the population by adopting a tournament selection method, and selecting an individual with the best fitness value according to the fitness value of each individual to perform crossover and mutation operations to generate a new individual;

step B5: repeating steps B2-B4 until a preset upper limit of iterations is reached, and then, performing step B6;

(2) ensemble strategy based on individual difference value step B6: selecting an individual with an optimal performance in the final-generation population as a benchmark, computing a difference value of other individuals in the population, and evaluating feature differences of the optimal individual and other individuals in the population according to the computed difference value;

wherein an expression of the computed difference value is shown as follows:

$$D(\text{best}, i) = |S_{best} \cup S_i| - |S_{best} \cap S_i|$$

wherein $S_{best}$ represents the number of feature labels of the optimal individual in the population, D represents the difference value, and Si represents the number of feature labels of other individuals in the population; and step B7: selecting seven individuals with the maximum difference value $S_{best}$ to perform voting ensemble to obtain the image classification solution.

7. The few-shot image classification method based on a hierarchical learning genetic programming algorithm of claim 6, wherein the image classification solution comprises the seven individuals formed by voting ensemble, and in step 6, image classification prediction is respectively performed on the to-be-classified image data by the seven individuals, the predicted class labels are respectively outputted, and a predicted class label with the highest cumulative count is selected as the image classification result for output.

* * * * *